E. E. SMITH.
WRIST JOINT FOR DENTAL HANDPIECES.
APPLICATION FILED JAN. 22, 1917.

1,233,817.

Patented July 17, 1917.

INVENTOR
Edward E. Smith
BY Diederich Reim + Fairbanks
ATTORNEYS

United States Patent Office.

EDWARD E. SMITH, OF PHILADELPHIA, PENNSYLVANIA.

WRIST-JOINT FOR DENTAL HANDPIECES.

1,233,817.
Specification of Letters Patent.
Patented July 17, 1917.

Application filed January 22, 1917. Serial No. 143,563.

*To all whom it may concern:*

Be it known that I, EDWARD E. SMITH, a citizen of the United States, residing in the city and county of Philadelphia, State of Pennsylvania, have invented a new and useful Wrist-Joint for Dental Handpieces, of which the following is a specification.

My invention consists of a guard applied to the power-conveying pulleys or wheel on the wrist pin of a dental engine, whereby said pulley or wheel is prevented from contacting with adjacent parts of the body and garments of a patient and injuring the same.

It consists also of details of construction as will be hereinafter set forth.

The invention is satisfactorily illustrated in the accompanying drawing, but the important instrumentalities thereof may be varied, and so it is to be understood that the invention is not limited to the specific details shown and described.

Similar numerals of reference indicate corresponding parts in the figures.

Figure 1:
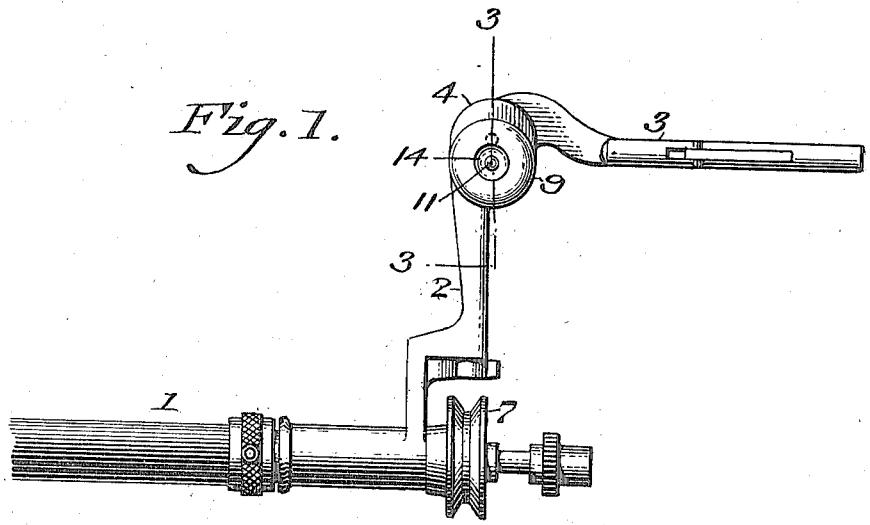
Figure 1 represents a side elevation of a wrist joint of a dental hand piece.
Figure 2:
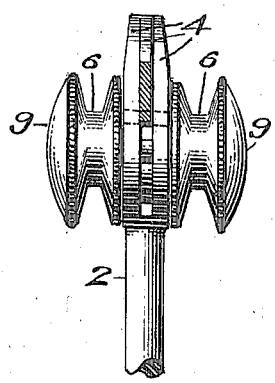
Fig. 2 represents an elevation of a portion, on an enlarged scale, at a right angle to Fig. 1.
Figure 3:
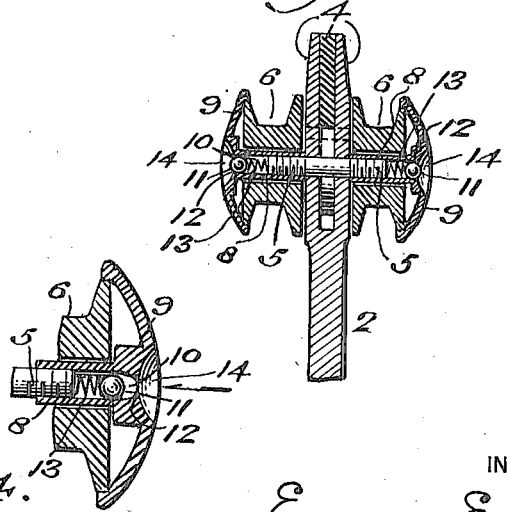
Fig. 3 represents a section on line 3—3 Fig. 1.

Referring to the drawings.

1 designates a dental hand piece which is connected with a wrist joint, which latter is composed of the arms 2 and 3, the knuckle 4 pivotally connecting said arms, the screw 5 which latter is passed through members of said knuckle and the guide pulleys 6 on said screw.

7 designates the guide pulley on the hand piece 1 said pulley being adapted to have thereon an endless belt or band which communicates the power of a dental engine to the implement in the hand piece 1, the members thus far enumerated being well known in the art.

The pulleys 6 are freely mounted on the bushings 8 which are of the form of sleeves whose inner end portions are interiorly threaded thus engaging with the threads on the screw 5, and removing the hubs of said pulleys 6 from contact with said screw.

The outer ends of said bushings have secured to them the caps 9 which are placed on the outer sides of said pulleys and held tightly in position by the engagement of the bushings 8 with the screw 5, said caps, however, in no wise preventing the freedom of rotation of said pulleys.

The caps are of the form of the segments of spheres so that they curve from their centers to the peripheral edges of the pulleys and cover the sides of the latter, whereby when the pulleys are revolving the operator's hand is removed from contact therewith, and if the caps touch the face or clothing of a patient they will not injure the same, this being due to their exterior rounded faces, and their stationary condition, hence they are non-injurious to anything with which they contact, the covering of the sides of the pulleys by said caps removing said sides, and in fact the peripheries of said pulleys from contact with surrounding objects.

Attention is directed also to the fact that the caps are of the form of segments of spheres whereby their exposed faces slope or curve from their centers to their peripheral edges which latter come close and flat to the peripheral edges of the pulleys at the outer sides thereof, and so are at least coincident with the said edges of the pulleys, so that the latter named edges do not project beyond the edges of the caps, while the rounded surfaces of the caps may contact with exterior objects, as the caps remain stationary and the pulleys revolve, said caps will not injure said exterior objects even if touching the same.

In the center of the caps are lubricating ducts 10 which are in communication with the outer ends of bushings 8 and having within them the ball valves 11 whose seats are on reduced portions 12 of the outer terminals of said ducts. Interposed in said bushings between the said valves 11, and the adjacent ends of the screw 5 are the springs 13, the object of which is to hold the valves 11 closed on their seats. In the exterior of the centers of the caps are the countersinks 14 which are in communication with the valve seats 12, and consequently with the bushings 8, it being seen that when the valves are pushed in, see Fig. 4, they are opened, and a lubricant or oil may be poured into the countersinks, the same then flowing through the ducts and bushings and reaching the sides of the knuckle 4, whereby it will reach the inner sides of the pulleys and consequently the hubs thereof, and the exteriors of the bushing, the effect of which is evident. When the valves are let-go they close on their seats, and so the escape of the lubricant at the outer ends of the bushings and through the caps is prevented.

The inner side of the caps is made concave or recessed so that the outer side member of the pulleys may be seated therein. To accomplish this, the diameters of said members are less than those of the caps whereby the peripheries of said members are within the peripheral rims of said caps, said peripheries being inturned so as to encircle the peripheral rims of the pulleys, whereby the latter named rims are overhung by the inturned peripheries of said caps and so completely covered whereby the peripheries of the latter are removed from liability to contact with exterior objects, which otherwise, when the pulleys are running, would rub, cut, or otherwise injure said objects, this being prevented by the caps in the manner stated.

Figure 4:
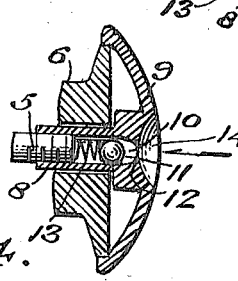
Fig. 4 represents a section of some of the members shown in Fig. 3 on a further enlarged scale.

In the present case, the tubular bushings or sleeves 8 are integral with the caps 9, one of which is most plainly shown in Fig. 4, and the portions of said bushings at their places of joining the inner sides of said caps are somewhat enlarged to form stronger connections of said bushings with said caps and to provide ample room for the seats 12 of the valves 11.

Having thus described my invention what I claim as new and desire to secure by Letters Patent, is:—

1. In a dental hand piece, a wrist joint on said piece composed of arms jointed together, and a screw forming the axis of the joint of said arms, a pulley mounted about said axis, and an exteriorly rounded cap connected with said screw, the inner side of said cap being adjacent to the side of one of the arms of said joint, and the outer side thereof being rounded from center to circumference thereof.

2. In a dental hand piece, a wrist joint on said piece, said joint being composed of arms, a knuckle joint for said arms, a screw forming the axis of said joint, a pulley on said screw, a sleeve on said screw, and means for connecting said sleeve with said screw, said pulley being mounted on said sleeve, and a cap connected with said sleeve and located on the outer side of said pulley.

3. A wrist joint for the hand piece of a dental engine, a guide pulley thereon, a bearing on a member of said joint for said pulley, and a guard on the exterior side of said pulley adapted to cover said pulley from center to circumference, said guard being of the form of the segment of a sphere, said bearing comprising a bushing carried by the guard and adapted to enter said pulley as the bearing therefor, and means for connecting said bushing with a member of said joint.

4. A wrist joint for a hand piece of a dental engine, a guide pulley on said joint, and a guard of the character stated for said pulley on the exterior side thereof, said guard being provided with means for admitting a lubricant to said pulley.

5. A wrist joint for a hand piece of a dental engine, a rotatable guide pulley mounted thereon, and a stationary exteriorly rounded guard for said pulley adjacent the outer side thereof, said guard having its peripheral portion inturned and freely encircling the peripheral rim of said pulley.

EDWARD E. SMITH.

Witnesses:
JOHN A. WIEDERSHEIM,
N. BUSSINGER.